2,927,000
PRODUCTION OF BARIUM HYDROXIDE

Fred W. Woodford, Joplin, Mo., assignor to The Eagle-Picher Company, Cincinnati, Ohio, a corporation of Ohio No Drawing. Application June 21, 1957
Serial No. 667,284

6 Claims. (Cl. 23—186)

This invention relates to a method of producing barium hydroxide which is adapted to be used as a pigment or for other purposes.

The primary objective of the invention has been to provide a simple process which may be practiced commercially on large scale if desired for producing barium hydroxide of good quality and purity from materials which are readily available, such as zinc calcine as produced by the roasting or desulphurization of zinc concentrates, and barium sulfide liquor as produced from the leaching of black ash. A further objective of the invention has been to provide a process which may be conducted conveniently at or about room temperature in a rapid and direct manner without the use of special or complex equipment.

It has long been known that barium hydroxide is formed by reaction between barium sulfide and zinc oxide in an aqueous medium. The reaction proceeds, theoretically, according to the equation:

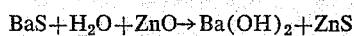

$$BaS + H_2O + ZnO \rightarrow Ba(OH)_2 + ZnS$$

However, when attempts are made to conduct this reaction under ordinary conditions, very poor results are obtained. At ordinary temperatures, for example, the reaction fails to go to completion even in the presence of an excess of zinc oxide; apparently, the formation of insoluble zinc sulfide on the surface of the particles of zinc oxide causes the reaction to fail. When this occurs, whatever barium hydroxide has been formed in the solution is contaminated with unreacted barium sulfide, which is a very undesirable component if the barium hydroxide is to be used for chemical purposes, and is also contaminated with a large amount of unreacted zinc oxide which is either lost or requires extra effort to separate from the barium hydroxide liquor. Unreacted zinc oxide also appears in whatever zinc sulfide precipitate is formed.

For these reasons, the yield and quality of barium hydroxide is low when efforts are made to conduct the reaction at ordinary temperatures, and the process, despite its theoretical possibilities, has never found commercial acceptance in competition with other more complex methods despite the fact that the reaction components have been readily available.

It was proposed many years ago to assist the reaction toward completion by utilizing zinc oxide of extremely fine particle size, but such a process is intolerably slow and the cost of using very finely divided zinc oxide is prohibitive. More recently, it has been proposed to utilize elevated temperature and pressure as a means of promoting and accelerating the reaction. In such instances, an aqueous solution containing a relatively low concentration of barium sulfide is employed and, after addition of the zinc oxide, the mixture is held under super-atmospheric pressure and corresponding temperature to effect reaction. Typically, for example, the process involves batch reaction in an autoclave wherein a temperature corresponding to a steam pressure of 50–250 pounds per square inch or more is exerted. Although these more severe conditions provide an improvement in the end result, the special equipment which is required increases the cost of the operation as a whole, and it is not well suited to continuous production.

Briefly, the present invention contemplates a method of producing barium hydroxide wherein barium sulfide and zinc oxide are caused to react in the presence of water at or about room temperature or below boiling point in a simple reaction vessel or tank at atmospheric pressure. In the present process reaction proceeds to completion yielding an aqueous barium hydroxide which may be readily separated from zinc sulfide for the production of a barium hydroxide pigment which is free of barium sulfide within the limits of accepted pigment specifications and which, if desired, may have a purity as high as 99+%.

The zinc component entering the reaction may be a relatively pure zinc oxide, of pigment grade for example, or a less pure and less finely divided product containing a substantial quantity of zinc oxide such as zinc calcine as obtained by roasting or desulphurization of a zinc concentrate, or a zinc oxide fume as obtained from the oxidation of scrap zinc metal or pyrometallurgical operation. The barium sulfide component entering the reaction conveniently may be so-called black liquor, as obtained by the aqueous leaching of black ash produced through the reduction of barytes or any other suitable barium sulfide source. Thus, except where indicated in the remainder of the specification and claims, the term "zinc oxide" is intended to include pigment, fume, or similar grades of zinc oxide as well as less pure zinc calcine, roasted or oxidic concentrates of which the particle size is considerably larger and the zinc content less, while the term "barium sulfide" is intended to include the purer grades of such material or less pure products such as black liquor.

This invention is based upon the discovery and determination that zinc oxide, regardless of its grade, purity, or particle size, can readily be caused to react with barium sulfide by initiating dissolution of zinc oxide in an aqueous barium hydroxide liquor prior to addition of barium sulfide thereto, and by maintaining a balance or excess of dissolved zinc within the barium hydroxide liquor with which barium sulfide will react in preference to reaction at the surface of undissolved zinc oxide particles. Otherwise expressed, the invention broadly contemplates establishing an aqueous barium hydroxide solution containing dissolved zinc oxide and undissolved zinc oxide, to which solution barium sulfide is added at a rate not exceeding, or at least at no time substantially exceeding, the rate at which the undissolved zinc oxide dissolves in the barium hydroxide solution.

Within the solution barium sulfide not only reacts rapidly with the dissolved zinc at relatively low temperatures to form barium hydroxide, but also reacts preferentially therewith instead of at the surface of the undissolved zinc oxide particles, i.e., as long as dissolution of zinc oxide into the solution exceeds or at least equals the rate at which zinc is being precipitated from the solution as zinc sulfide, the reaction will continue to proceed in an uninterrupted way without requiring utilization of strenuous temperature or pressure conditions or special equipment.

In this process no intermediate reagent need be employed since the barium hydroxide liquor or solution used to initiate the dissolution of zinc oxide may be a portion of the previously prepared end product whether the process is conducted batchwise or continuously. In either procedure, only a simple control need be exercised to maintain the presence of dissolved zinc in the aqueous medium to which barium sulfide is added or to avoid the presence of a stoichiometric excess of barium sulfide with respect to dissolved zinc oxide at any given time. Thus, the progress of reaction readily may be controlled in accordance with simple tests for dissolved zinc and free barium sulfide.

A second feature of the present invention is predicated upon the discovery and determination that the purity or quality of the barium hydroxide end product may be improved by excluding air from the barium sulfide liquor prior to use and from the presence of the site of reaction. Apparently, barium sulfide in aqueous solution suffers degradation as well as the known hydrolysis when exposed to air, and oxidized sulfur compounds may be formed which do not readily react with zinc oxide but which appear as "sulfides" upon analysis of the barium hydroxide end product. By excluding air from the reaction and from the barium sulfide liquor during its preparation or storage awaiting use, such as by maintaining a blanket of inert gas over the liquid, the "sulfide" content of the barium hydroxide readily may be held below the limits of commercial specifications. For such blanketing, nitrogen is a satisfactory gas, although other inert gases may be used.

The solution of barium hydroxide which is used to initiate the dissolution of zinc oxide prior to the introduction of barium sulfide (which may be called the starting solution or seed liquor), is a less than saturated aqueous solution and, in fact, may be quite weak. For example, a starting solution containing approximately 12 to 60 grams of barium hydroxide per liter is satisfactory.

The temperature of the starting solution affects the rate at which zinc oxide will dissolve therein, the rate increasing as the temperature increases. However, high temperatures need not be employed; for example, satisfactory results are obtained at approximately 70–80° C. Higher temperatures may be used if desired, but neither temperatures above the solution boiling point nor greater than atmospheric pressure are necessary. The barium hydroxide content of the starting solution affects the rate at which zinc oxide dissolves therein; for example, an aqueous solution containing 16 grams of barium hydroxide per liter provides a dissolved zinc content of .21 gram per liter, while a solution containing 38 grams of barium hydroxide per liter provides a dissolved zinc content of .96 gram per liter, and a solution containing 100 grams per liter of barium hydroxide furnishes 2.3 grams per liter of dissolved zinc, etc. Since the rate at which barium sulfide subsequently is added to the solution readily may be adjusted so as not to deplete the solution of dissolved zinc, it will be seen that the use of weak starting solution is generally just as acceptable to the practice of the process as a strong solution. This fact provides a distinct operating advantage in enabling the use of wash water produced in the washing of the zinc precipitate (which may contain as little as 12 grams per liter of barium hydroxide or less as subsequently explained) to be used to initiate the dissolution of zinc in a successive batch or semi-continuous type of operation. In the continuous type of operation, of course, the use of starting solution is required only at the commencement of the process; thereafter added zinc oxide dissolves in barium hydroxide formed by reaction once the reaction has been inaugurated.

The particle size of the zinc oxide also affects its rate of dissolution, increasing as the size of the particles diminishes. Although pigment or fume grades of zinc oxide, in which the particle size is quite small, readily may be used in the practice of the process, better economy of operation is obtained by the use of zinc calcine as produced by hearth-type or flash-type roasting of zinc concentrates. This material, of course, is less pure than a pigment grade zinc oxide, that is, it contains less zinc, and the particle size is considerably larger; for example, the typical calcine of a Tri-State concentrate contains approximately 66% zinc, a total sulphur content of approximately 5%, and a sulphate content of about 0.5% by weight. Some particles in a typical calcine may be retained on a —30 mesh screen, while a majority of the others will pass —100 mesh. Calcine screened until 100% of the particles will pass a —30 mesh screen has proven satisfactory, which, of course, is a very large particle size compared to zinc oxide suggested for reaction with barium sulfide in past efforts.

In batch operation all of the zinc oxide which is to enter the reaction in the batch may be introduced at once into the barium hydroxide starting liquor, or it may be added gradually or continuously, as, of course, is necessary in a continuous type of operation. If desired, dissolution of zinc oxide may be conducted in one tank, and the zinciferous hydrate liquor may then be transferred to another tank for reaction with barium sulfide. Also, in either type of operation the barium sulfide may be added gradually either at uniform or varying rate proportioned to avoid depletion of dissolved zinc. Particularly in batch reactions, and preferably during at least a major portion of the period while reaction is being conducted, it is generally desirable to maintain a molar excess of approximately 20–200% or more of zinc oxide in relation to the barium sulfide being added, although an excess of as little as 5% may be used satisfactorily when the zinc oxide component is of the pigment or fume grade.

At or near the end of the reaction period, that is, after all or most of the barium sulfide has been added, the solution may or will contain unreacted zinc oxide, some dissolved, some undissolved, the amounts depending on the amount of the excess used. If the reaction solution is now filtered, whatever undissolved zinc oxide is present will appear in the zinc sulfide precipitate, while dissolved zinc oxide will follow the barium hydroxide filtrate and appear therein.

In instances where a substantially zinc-free end product is desired, the process may be controlled so as to cause depletion of dissolved zinc content as the reaction nears completion, either by decreasing the feed rate of zinc oxide or increasing the feed rate of barium sulfide so as to use up by reaction whatever dissolved zinc is present in the solution by the time the operation is completed. In the alternative, a filtrate containing barium hydroxide solution produced in the main reaction may, in a second step, be contacted with barium sulfide just sufficiently to precipitate all of the dissolved zinc therein, followed by a second filtration to remove the precipitate before evaporating water from the end product thus purified.

In the practice of the process of this invention, the best commercial source of barium sulfide at present is from so-called black ash which is produced by the reduction of barytes. The black ash may be leached with water at approximately 80° C. or higher sufficiently to dissolve the barium sulfide content thereof. For example, a suitable barium sulfide liquor may be prepared by adding approximately 84 pounds of commercial black ash (approximately —8 mesh particle size) to approximately 428 pounds of water and agitating the mixture for approximately one and one-half hours or sufficiently to dissolve the water-soluble sulfide content. After this the solution is allowed to stand (approximately two hours, for example) to permit insoluble material or gangue to separate therefrom, such as particles of coal, ash, and other impurities which were either originally present in the barytes or which entered during its reduction. After settling, the black liquor is decanted and, if prepared in the proportions indicated, will have a barium content of approximately 111.0 grams per liter, as Ba, or 9.9% by weight.

Solutions containing other concentrations of barium sulfide readily may be used in the practice of the process and the foregoing example is in no way limitative. The latitude in this respect permits control to be exercised as to the rate at which barium sulfide is added to the reaction solution, either by varying the rate at which a solution of barium sulfide of given concentration is introduced or by varying the concentration of a solution which is introduced at a given rate. Moreover, it will be seen that a relationship exists between the barium hydroxide content in the reaction vessel and the rate at which barium sulfide solution is added; upon reaction of barium sulfide with zinc oxide barium hydroxide is formed, thereby increasing the concentration thereof then existing, but inasmuch as the barium sulfide was added in aqueous solution, the concentration of barium hydroxide thereby is reduced to the extent of the added water content. By balancing the rate at which barium hydroxide is formed in relation to the rate at which water is added via the barium sulfide solution (and the rate at which barium hydroxide liquor may be withdrawn from the reaction vessel if desired), a substantially uniform solids concentration may be achieved. On the other hand, if build-up of solids is permitted as the reaction proceeds, no problem of operation is encountered since the concentrations of all of the reaction components are well below the saturation point. Since water must eventually be removed from the barium hydroxide end product, it is generally desirable to operate at a relatively high barium hydroxide content level to minimize water evaporation costs.

It has previously been known that barium sulfide in aqueous solution hydrolyzes into secondary products upon standing. Products of hydrolysis have been identified principally as barium hydroxide and barium sulfhydrate. However, it appears from my work that other secondary reactions occur which are not readily explainable but which may include the formation of oxidized sulfides of barium when aqueous barium sulfide solution is exposed to air, and these secondary products appear to adversely affect reaction of the "barium sulfide" liquor with zinc oxide. By excluding atmospheric air from the barium sulfide liquor during leaching of black ash, while the liquor is awaiting use, and also from the reaction vessel, improved results are obtained. Exclusion of air is accomplished readily by closing the leaching, storage, and reaction vessels and by maintaining a blanket of inert gas such as nitrogen over the liquid therein or in other suitable manner.

Apparently, the formation of oxidized sulfur compounds or oxidation or perhaps carbonation products is prevented in this manner. At any rate, inert gas blanketing reduces the reaction time (for example, from five to three and one-half hours) and causes a reduction, in the end product, of a content which is reducing to iodine and which, therefore, is reportable as sulfides; for example, from 0.3–0.5% when unblanketed to 0.11–.05% with blanketing. The extent to which calcine is present in excess in the hydrate liquor during reaction also may be reduced when blanketing is used. Thus, although the process of the present invention in its chemical aspects may be conducted satisfactorily in the atmosphere, the present invention also contemplates more advantageous practice of the process by maintaining a blanket of inert gas over the sulfide liquor during its preparation and storage and over the liquid in the reaction vessel for the purpose of excluding air therefrom.

In this respect, it is also generally desirable to use a "fresh" solution of barium sulfide, that is, a solution prepared within approximately twenty-four hours preceding use. The nature of the reaction with zinc oxide of any barium sulfhydrate which may have been formed by hydrolysis during prolonged storage is not known, but may account for the presence of small quantities of "sulfide" in the finished end product, and the use of freshly prepared black liquor is believed to be helpful in discouraging such formation.

The following examples further illustrate different ways in which the process of this invention may be practiced. In the examples, grams per liter is abbreviated g.p.l.

Example 1.—Single tank process

Zinc calcine 200% by weight in excess of the stoichiometric BaS equivalent was slurried in an aqueous barium hydroxide solution of 28.9 g.p.l. concentration in a sealed tank equipped with a suitable agitating device. The slurry was maintained at 80° C. An aqueous solution of relatively low concentration barium sulfide (162.5 to 193.9 g.p.l.) was added continuously, and increments of zinc calcine were also added during the late stages of the reaction according to the following schedule:

| Time, hours | 3.0 | 1.0 | 1.0 |
|---|---|---|---|
| Percent BaS Added (by weight) | 87.5 | 6.25 | 6.25 |
| Rate of Adding BaS, mls./min | 4.87 | 1.0 | 1.0 |
| Percent Excess Calcine Added | none | 50.0 | 50.0 |

Example 2.—Single tank process using pigment grade zinc oxide

Pigment grade zinc oxide 5% by weight in excess of the stoichiometric BaS equivalent may be slurried in aqueous barium hydroxide liquor of 24.7 to 63.5 g.p.l. concentration in a sealed tank equipped with a suitable agitating device. The slurry is heated and maintained at approximately 80° C. A solution containing a relatively low concentration of barium sulfide (151.5 to 175.7 g.p.l.) may be added continuously, generally according to the following schedule:

| Time, hours | 3.0 | 2.0 |
|---|---|---|
| Percent BaS Added (by weight) | 87.5 | 12.5 |
| Rate of Adding BaS, mls./min | 3.88 to 4.86 | 0.83 to 1.0 |

Example 3.—Two tank process using zinc calcine

Dry zinc calcine and wash water containing barium hydroxide, as provided by the washing of the zinc cake produced in an earlier reaction, are brought into admixture with one another in a first tank which may be termed a digester and which is equipped with an agitator. In this tank zinc calcine is caused to dissolve in the barium hydroxide solution. From this tank, preferably near its upper level, a stream of liquid containing dissolved zinc is fed to a second tank or reactor which is also equipped with an agitator. A stream of barium sulfide liquor is added to the reactor for reaction with the dissolved zinc in the hydrate liquor therein. While maintaining a temperature of approximately 80° C., liquid is withdrawn from the reactor, preferably near the bottom, and is recycled by means of a pump to the digester, and a stream of wash water may also be added to the digester to prevent excessive solids build up in the circuit. Thus, barium hydroxide is circulated from the reactor to the digester wherein its dissolved zinc content is replenished, after which it is carried to the reactor for reaction with barium sulfide being added thereto.

In this type of process, the circulating hydrate liquor may contain a barium concentration of approximately 54 g.p.l.; calcine may be added to the digester at a rate of 0.5 gram per minute, and barium sulfide liquor having a barium concentration of approximately 106 g.p.l. may be added to the reactor at a rate of approximately 5.0 ml./min. The wash water (or other suitable source of barium hydroxide solution) introduced into the digester along with the circulating hydrate liquor may contain barium concentration of approximately 15 g.p.l. and may be added at a rate of approximately 5.0 ml./min.

By this process a final hydrate liquor containing barium concentration of approximately 55 g.p.l. is produced.

Upon completion of the reaction, the solution is filtered to produce a zinc cake, and the yield is a barium hydroxide liquor containing 87.5% of the barium introduced into the reactor. The balance of the barium is retained in the zinc cake from which it is now washed with water to provide the wash water used for addition to the digester in a later operation. In this type of operation, at the addition rates given the zinc calcine is present to the extent of approximately 21% in molar excess of the stoichiometric amount required for reaction with the total barium sulfide added.

*Example 4.—Tank-tower process*

According to the process zinc calcine is caused to go into solution in a digester containing aqueous barium hydroxide solution. Solution continuously withdrawn from the bottom area of the digester is circulated through an elongated conduit by means of a pump back to an upper portion of the liquid in the digester, and barium sulfide is added to the circulating stream so that reaction occurs during circulation while a stream of wash water or other aqueous solution containing barium hydroxide and a flow of zinc oxide are added to the digester.

In this type of operation hydrate liquor from the digester may be circulated at a rate of 500–600 ml./min., and the temperature may be approximately 70° C. Barium sulfide liquor containing approximately 106 g.p.l. of barium may be added to the circulating stream at a rate of approximately 5.0 ml./min. To the digester from which solution is drawn for circulation and reaction, zinc calcine may be added at a rate of approximately 0.5 gram per minute, and wash water containing a barium concentration of approximately 16.0 g.p.l. may be added at a rate of approximately 3.5 ml./min., thereby providing a molar excess of approximately 21% zinc in relation to the barium sulfide used. In this process approximately 85.5% of the barium added is recovered in the filtrate after filtration and washing of the zinc sulfide precipitate and other solids therefrom.

In a variation of this process, the rate at which hydrate liquor is withdrawn from the digester and circulated by the pump may be increased to 1100–1500 milliliters per minute at a temperature of 80° C., and barium sulfide liquor containing approximately 152 g.p.l. of barium may be added at a rate of 6.6 ml./min., while zinc calcine is added to the digester at a rate of 0.7 gram per minute. In this procedure 91.2% of the barium added appears in the barium hydrate liquor after filtration and washing of the same.

*Example 5.—Continuous operation*

For continuous operation the tank-tower method described in the previous example may be employed, but a portion of the liquid may be withdrawn from the recirculating conduit just ahead of the digester (for example, at a rate of approximately 0.20 pound Ba per hour per tank gallon), while the balance of the recirculating stream is returned to the digested. In this case the diverted portion may be directed to a filter, and the rate at which reacted liquid is withdrawn from the circulating stream may be proportioned in relation to the rate of feed material to provide a substantially uniform solids concentration in the circulating stream.

During reaction of barium sulfide with dissolved zinc according to the examples given or other variations of the process, the rate of addition of barium sulfide readily may be controlled to avoid depletion of dissolved zinc by periodically testing the solution to determine the presence of dissolved zinc or the presence of free barium sulfide.

*Example 6—Single tank continuous operation*

A variation of the continuous process described in the previous example may employ only a single tank equipped with a suitable agitating device.

In this version of the process, zinc calcine is caused to go into solution in a starter solution maintained at a temperature of approximately 70° C. and containing approximately 100 g.p.l. of barium. The zinc calcine is added near the top of the tank at a rate of approximately 0.19 lb. calcine/hr./tank gallon. Barium sulfide liquor having a barium concentration of approximately 12.4% may be added near the bottom of the tank at a rate of approximately 0.20 lb. barium/hr./tank gallon. A portion of the slurry containing approximately 100 g.p.l. of barium in the liquor is withdrawn near the top of the tank at a rate of approximately 0.20 lb. barium/hr./tank gallon and diverted to a filter.

To test for dissolved zinc, as may be necessary from time to time during progress of reaction, the generally accepted standard volumetric potassium ferrocyanide method may be used. The presence of dissolved barium sulfide may be determined qualitatively for purposes of plant control by adding an alkaline lead solution (lead oxide dissolved in barium hydrate solution) to a filtered sample of the hydrate liquor in order to provide visual comparison of black lead sulfide precipitate against samples of known sulfide content.

For the quantitative determination of dissolved barium sulfide, a 20 ml. sample of filtered barium hydrate liquor is pipetted into 100 ml. distilled water and 15 ml. 10% zinc acetate solution, 2 ml. formaldehyde, and 15 ml. glacial acetic acid are added. An excess of 0.01 N iodine solution is then added from a burette. The solution is allowed to stand for two to three minutes, then the excess iodine is back-titrated with 0.01 N sodium thiosulfate solution.

Dissolved zinc sulfide also may be determined potentiometrically by measurement of the potential differences of two electrodes (for example, glass and platinum) immersed in the reacting hydrate slurry. The potential difference varies with changes in the barium sulfide concentration in the hydrate liquor.

As previously noted, it will be understood that the process may be practiced in variations other than those disclosed in the preceding examples and also that the barium contents of the starting, circulaitng, and finished liquors are limited only by the solubility of barium at the temperature of operation selected, which may range from room temperature to about 100° C.

In operation of the process according to the examples given or variations thereof, blanketing to exclude air readily may be provided by utilizing closed tanks and by supplying a cover of nitrogen gas therein. If desired, a nitrogen supply line common to all tanks may also be connected to an elastic bag for maintaining a substantially uniform nitrogen pressure despite variations of liquid level.

The zinc cake produced by filtration of the aqueous barium hydroxide solution furnished through the reaction may be washed or repulped with water at least once and preferably two or three times to dissolve and thereby recover the entrained barium hydroxide retained therein for reuse. For example, the wash water from the first wash of a zinc cake produced in the method of Example 3 will contain a barium concentration of approximately 14.5 g.p.l., and therefore, is adapted to be reused as a barium hydroxide solution in which further reaction may be inaugurated or supported. In successive washes of the cake, the barium content, of course, is much lower, and such water may be wasted or otherwise reused in the process such as for leaching black ash, while the zinc cake may either be used as a zinc sulfide pigment or may be neutralized with sulfuric acid and then reroasted for reuse in the process.

Having described my invention, I claim:

1. The method of making barium hydroxide which method comprises, dissolving zinc oxide in an aqueous solution of barium hydroxide containing at least approximately 12 grams per liter of barium hydroxide, adding barium sulfide and zinc oxide to said barium hydroxide solution containing dissolved zinc, and controlling the rate of addition of each reactant to maintain a stoichiometric excess of zinc ions in the solution while the barium sulfide is being added, until the process is to be discontinued.

2. The process of claim 1 wherein the zinc oxide added to the barium hydroxide solution which contains dissolved zinc is in the form of zinc calcine containing a substantial amount of zinc oxide.

3. The process of claim 1 wherein the first said barium hydroxide solution is black liquor resulting from the leaching of black ash with water.

4. The method of making barium hydroxide which method comprises, dissolving zinc oxide in an aqueous barium hydroxide solution containing at least approximately 12 grams per liter of barium hydroxide, adding barium sulfide and zinc oxide to the barium hydroxide solution which contains dissolved zinc, controlling the rate of addition of each reactant to maintain a stoichiometric excess of zinc ions in the solution throughout the period that barium sulfide is added thereto until the addition of zinc oxide is to be terminated, and then adding only barium sulfide to the solution to deplete the solution of dissolved zinc.

5. A continuous process of making barium hydroxide which comprises, initiating the process by dissolving zinc oxide in an aqueous barium hydroxide solution containing at least approximately 12 grams per liter of barium hydroxide, thereafter continuously adding barium sulfide and zinc oxide to the barium hydroxide solution which contains dissolved zinc, continuously controlling the rate of addition of each reactant to maintain a stoichiometric excess of zinc ions in the solution while the barium sulfide and zinc oxide are being added, continuously withdrawing a portion of the solution to which zinc oxide and barium sulfide have been added, and filtering the same to recover the barium hydroxide therein as a filtrate.

6. The process of making barium hydroxide which comprises, dissolving zinc oxide in an aqueous barium hydroxide solution containing at least approximately 12 grams per liter of barium hydroxide, adding barium sulfide and zinc oxide to the barium hydroxide solution which contains dissolved zinc, controlling the rate of addition of each reactant to maintain a stoichiometric excess of zinc ions in the solution while the barium sulfide is being added thereto until the process is to be discontinued, filtering the solution to separate zinc sulfide from aqueous barium hydroxide liquor, and recycling at least a portion of the said barium hydroxide liquor as solution for dissolving additional zinc oxide.

References Cited in the file of this patent

UNITED STATES PATENTS

| | | |
|---|---|---|
| 338,628 | Brin et al. | Mar. 23, 1886 |
| 1,944,281 | Stephans | Jan. 23, 1934 |
| 2,770,528 | Maynard | Nov. 13, 1956 |

FOREIGN PATENTS

| | | |
|---|---|---|
| 389,044 | Great Britain | Mar. 9, 1933 |